Aug. 5, 1969     D. S. BREED     3,458,991

DASHPOT TIMER HAVING A COATED PISTON

Filed Dec. 1, 1967

INVENTOR
DAVID S. BREED
BY
Kane, Dalsimer, Kane, Sullivan & Smith
ATTORNEYS

United States Patent Office 3,458,991
Patented Aug. 5, 1969

3,458,991
DASHPOT TIMER HAVING A COATED PISTON
David S. Breed, 57 Hoagland Ave.,
Rockaway, N.J. 07866
Filed Dec. 1, 1967, Ser. No. 687,207
Int. Cl. G04f 1/08
U.S. Cl. 58—144                               8 Claims

ABSTRACT OF THE DISCLOSURE

A timing mechanism of the dashpot type wherein a cylindrical piston travels in a cylinder at a controlled rate, the piston having a coating of polymeric material on the cylindrical surface adjacent the interior wall of the cylinder to insure a consistent rate of descent of the piston within the cylinder.

BACKGROUND AND SUMMARY OF THE INVENTION

The present invention relates to a timer comprising a piston which travels in a cylinder at a controlled rate due to the predictable fluid flow rate through the predetermined annular clearance between the piston and interior cylinder wall. A dashpot timer of this general type is further described in U.S. Patent No. 3,171,245 issued on Mar. 2, 1965.

It has been proposed to dispose the piston against the wall of the cylinder by various means, such as by inclining or tilting the cylinder, in order to insure accurate reproducibility of the rate of descent of the piston on each run. However, in certain applications, space or other limitations preclude the use of the common devices to dispose the piston against the cylinder wall. Also, it has been found that when space limitations require the use of a piston having a small axial length relative to its diameter, there will be a tendency for the piston to cock in the cylinder. This inadvertent cocking in turn has an effect on the consistency of the piston rate of descent.

In the above situations, it is desirable that some provision be made to assure that the piston will maintain the same positioning relative to the cylinder on each run. Heretofore, no effective means to accomplish this requirement had been devised.

The present invention relates generally to a dashpot timer comprising a cylinder filled with a fluid in either gaseous or liquid form. A cylindrical piston is disposed in the cylinder, the cylindrical surface of which is coated with a polymeric material. The microscopic surface irregularities which are inherent in the polymeric coating on the piston have been found to effectively maintain a precise and consistent orientation of the piston in the center of the cylinder, as well as contribute to the predictability of the fluid flow rate between the piston and cylinder wall.

In the case of air or gas dashpots, the piston is made from a material having a coefficient of expansion somewhat less than that of the material from which the cylinder is made. In the case of liquid dashpots, the piston material has a somewhat higher coefficient of expansion. This factor is important in compensating for effects of temperature variation on the accuracy of the device, as hereinafter further described.

It is an object of the invention to provide an accurate dashpot timer for use in those applications where space or other limtiations preclude the use of known devices for insuring the consistent positioning of the piston within the cylinder. It is a further object of the invention to provide a timer which is exceptionally reliable, susceptible to long life and relatively inexpensive to manufacture. Another object is to provide a timer which is accurate over a wide range of temperatures.

Other objects and advantages of the present invention will become apparent to those skilled in the art from the following detailed description.

DESCRIPTION OF THE PREFERRED EMBODIMENT

Figure 1:
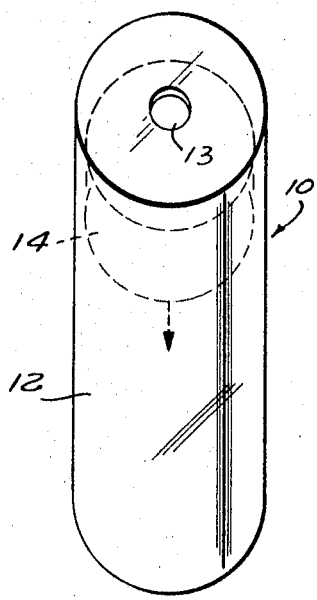
FIGURE 1 is a perspective view of the dashpot timer incorporating the teachings of the present invention.
Figure 2:
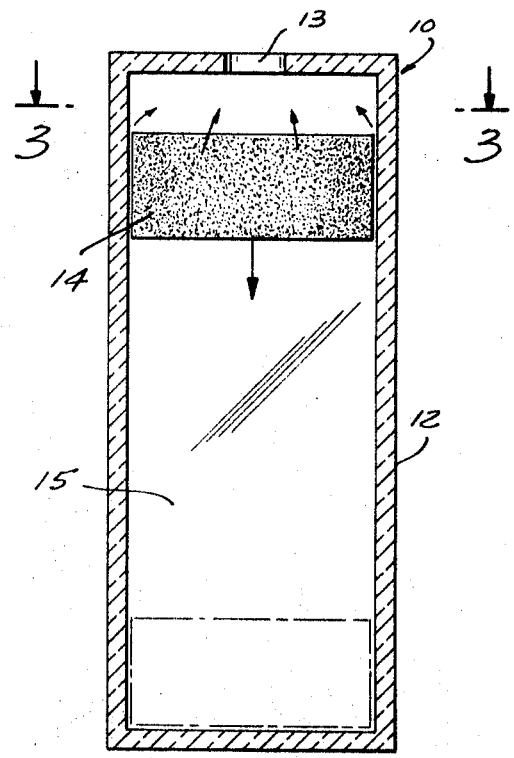
FIGURE 2 is a horizontal sectional view thereof.
Figure 3:
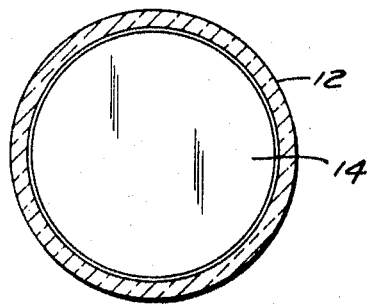
FIGURE 3 is a view taken along the line 3—3 of FIGURE 2.

In FIGURES 1-3, a dashpot timer 10 is illustrated which incorporates the teachings of the present invention. The timer includes a ceramic cylinder 12 in which a ceramic piston 14 is slidably disposed. The cylinder 12 may be sealed at both ends, or it may be open at one end as shown at 13. The exterior cylindrical surface of the piston 14 has a coating of a polymeric material 16 applied thereto. The interior wall of the cylinder 12 and the coated piston 14 have their mating diameters very closely dimensionally controlled to provide a determinable clearance 18 through which a fluid 15, in either a gaseous or a liquid form, is adapted to flow. The determinable clearance permits the time interval required for the longitudinal travel of the piston 14 in cylinder 12 to be accurately controlled.

The fluid 15 may be a gas such as air, or a liquid such as silicone fluid. It will thus be apparent that by proper choice of fluid 15, and by proper design of the determinable clearance 18, the time delay may be varied from a fraction of a second to several months duration.

It should be understood that a great many polymeric materials are suited for use as the coating 16. However, the use of a fluorocarbon polymer such as Teflon is preferred.

The invention contemplates the use of any suitable ceramic material in the fabrication of the cylinder and piston. However, the use of glass is preferred since it has many advantages, among which are its low cost, large volume production techniques, superior wear characteristics, corrosion resistance, and its low thermal coefficient of expansion. The availability of glasses having slightly different coefficients of expansion is also important in compensating for the effects of temperature variation on the accuracy of the device as described below.

Since the viscosity of a gas increases with the temperature, one would expect the time delay of a gas filled dashpot to also increase, assuming all other factors remained constant. It has been found however, that by choosing a piston material having a coefficient of expansion somewhat less than that of the ceramic used for the cylinder, an increased clearance will result with an increase in temperature. By proper design, this increased clearance will permit the same flow rate of the thicker or higher viscosity gas as at the lower temperature.

In the case of a dashpot filled with a liquid such as silicone fluid, consideration must be given to the fact that the viscosity will decrease with an increase in temperature. Thus the piston material will necessarily have a higher coefficient of expansion than the cylinder if the time delay is to remain constant.

Figure 4:
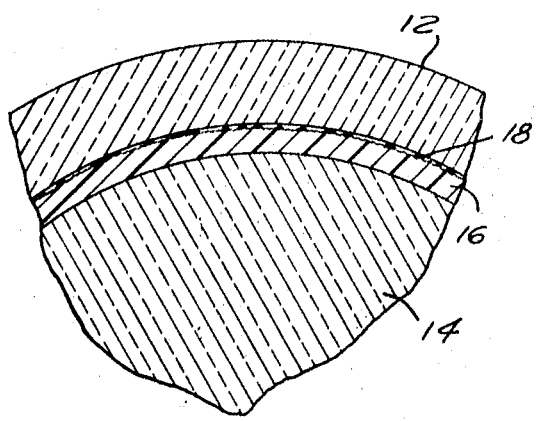
FIGURE 4 is an enlarged view of a portion of FIGURE 3.

It is an important feature of the present invention to utilize the microscopic surface irregularities (shown in exaggerated fashion in FIGURE 4) in the polymeric coating on the piston to insure the reproducibility and thus accuracy of the device. The irregularities are in the nature of myriad and resilient high spots which tend to keep the piston centered in the cylinder. Also, the irregularities produce a serpentine or labyrinth fluid flow between the walls of the cylinder and piston which is much more predictable and consistent in total flow volume than is a straight line flow. These factors combine to produce a highly accurate dashpot timer which can be utilized in many applications not heretofore possible.

Since the coating thickness can be accurately controlled to within 50 millionths of an inch, a relaxation of the tolerances on the piston and cylinder is permitted. This relaxation substantially reduces the cost of manufacturing the piston and cylinder and thus contributes to the use of the timer in low cost applications.

Coatings of Teflon of from .0002 to .001 inch have been successfully applied. Multiple coatings could, however, be applied such that thicknesses of several thousandths of an inch could be built up while still maintaining the required roundness tolerances. The utilization of the surface irregularities in the coating film is particularly applicable when the clearance between the piston and cylinder measured on the radius is between .00005 inch and .0002 inch. However, by increasing the coating particle size, clearances somewhat larger than this could still make use of this advantage.

The polymeric coating may be applied by placing the piston on a mandrel which is rotated at a speed in the order of 100 r.p.m. The coating is applied from a spray gun which may be operated by a solenoid for a predetermined length of time to control the depth of the coating. In order to insure a good adherence of the coating to the piston surface, it may be necessary to etch the surface with a suitable acid, such as hydrofluoric, before spraying.

I claim:

1. A dashpot timer of the class described, comprising a fluid filled cylinder having a precision internal cylindrical bore, and a cylindrical ceramic piston disposed in said cylinder, the cylindrical surface of said piston having a polymeric coating of predetermined thickness thereon to form a predetermined annular clearance between the piston and the surface of said cylindrical bore, said polymeric coating including myriad and resilient high spots in contact with said bore surface to maintain said piston centered in said bore and to cause a serpentine fluid flow through said annular clearance whereby a consistent rate of descent of the piston within the cylinder is insured.

2. A dashpot timer of the class described comprising a ceramic cylinder having a prevision interior cylindrical wall, a ceramic piston slidably disposed in said cylinder, the exterior surface of said piston being substantially cylindrical and having a polymeric coating thereon of predetermined thickness to form a predetermined annular clearance between the piston and the surface of said cylindrical wall, said polymeric coating including myriad and resilient high spots in contact with said wall to maintain said piston centered within said cylindrical wall and to cause a serpentine fluid flow through said annular clearance whereby a consistent rate of descent of the piston within the cylinder is insured, and a fluid filling the interior of said cylinder.

3. A dashpot timer as described in claim 2 wherein the fluid filling the cylinder is air.

4. A dashpot timer as describe in claim 2 wherein the fluid filling the cylinder is silicone.

5. A dashpot timer as described in claim 4 wherein the ceramic piston has a coefficient of expansion less than that of the cylindrical wall of said cylinder.

6. A dashpot timer as described in claim 5 wherein the polymeric coating on the piston is Teflon.

7. A dashpot timer as described in claim 4 wherein the ceramic piston has a coefficient of expansion greater than that of the cylindrical wall of said cylinder.

8. A dashpot timer as described in claim 7 wherein the polymeric coating on the piston is Teflon.

References Cited

UNITED STATES PATENTS

| | | | |
|---|---|---|---|
| 1,955,565 | 4/1934 | Schmidt et al. | 92—248 |
| 2,607,342 | 8/1952 | Abel | 92—170 |
| 2,714,927 | 8/1955 | Stern et al. | 58—144 |
| 3,041,871 | 7/1962 | Lö Blich | 58—144 |
| 3,171,245 | 3/1965 | Breed | 58—1 |

RICHARD B. WILKINSON, Primary Examiner

EDITH C. SIMMONS, Assistant Examiner

U.S. Cl. X.R.

58—1; 92—248